(No Model.)
C. L. WORK.
BOOK HOLDER.
No. 272,008. Patented Feb. 6, 1883.
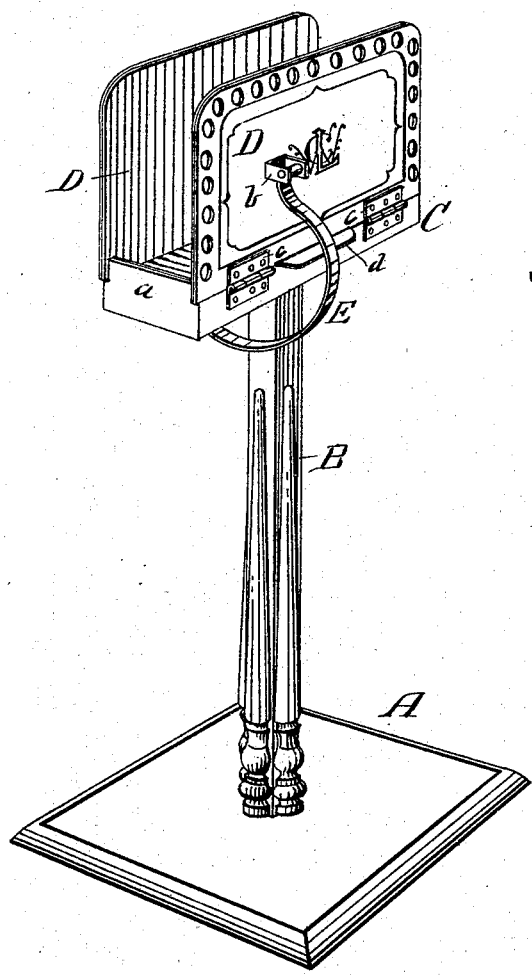
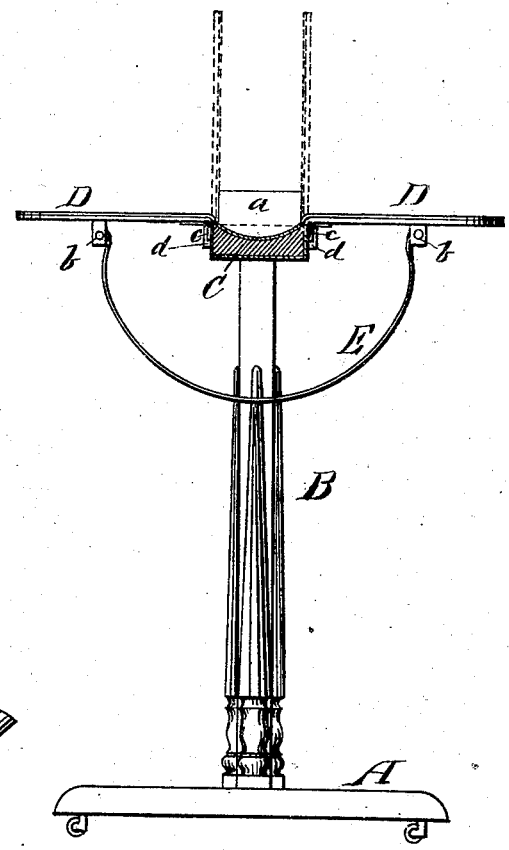
WITNESSES:
Chas. T. Howell,
C. Sedgwick
INVENTOR:
C. L. Work
BY Munn & Co
ATTORNEYS.

UNITED STATES PATENT OFFICE.

CHARLES L. WORK, OF MOUNT VERNON, OHIO.

BOOK-HOLDER.

SPECIFICATION forming part of Letters Patent No. 272,008, dated February 6, 1883.

Application filed September 30, 1882. (No model.)

*To all whom it may concern:*

Be it known that I, CHARLES L. WORK, of Mount Vernon, in the county of Knox and State of Ohio, have invented a new and Improved Book-Holder, of which the following is a full, clear, and exact description.

My improvements relate to book-holders or stands for receiving large books, such as dictionaries; and the invention consists in certain novel features of construction, having the object to retain the book in better shape and to facilitate its use, as hereinafter described and claimed.

Reference is to be had to the accompanying drawings, forming a part of this specification, in which similar letters of reference indicate corresponding parts in both the figures.

Figure 1 is a perspective view of my improved book-holder. Fig. 2 is a side view of the same, partly sectional.

A is the base, to which is fixed a standard, B, that supports the book-holder proper on its upper end. The base and standard may be made of any suitable material and of any form or shape, and, if desired, the base may be provided with casters to facilitate the movement of the stand from place to place. The holder upon the upper end of the standard B consists of a bottom piece, C, that is attached firmly to the standard, and of leaves D D, that are hinged at c to the sides of the piece C. The bottom piece, C, is concave upon its upper surface, so as to receive the back of the book, and is formed with end flanges a a, to prevent endwise movement of the book and also limit the closing movement of the leaves D. The leaves D are formed of sheet metal or other suitable material, ornamented in any desired manner.

E is a flat bow-spring, attached at the ends to lugs b, that project from the sides of the leaves D. The spring curves beneath the bottom piece, C, so that when the leaves are closed, as shown in Fig. 1, the spring acts to retain them in that position; but when the leaves are open, as shown in Fig. 2, the ends of the spring connected to the lugs b are carried below the hinges c, so that the force of the spring is exerted to retain the leaves in the open position. Upon the leaves D, next to the bottom piece, C, are flanges d d, that, taking against the bottom piece, C, serve as a support for the leaves in their open position. It will be seen that when the leaves D are closed a receptacle is formed for receiving the closed book, and when the leaves are opened to the horizontal position shown a firm, flat surface is presented for the open book. The concavity of the bottom piece, C, should be slightly more than the convexity of the book, so that the weight of the book will tend to hold it in position. There will be no liability of the leaves closing while in use, as the spring holds them open. The bottom piece, C, may be adjustably attached to the standard to allow of its being turned to a slightly-inclined position, so as to throw the book in the same position as if it were upon a desk.

Having thus described my invention, I claim as new and desire to secure by Letters Patent—

1. In book holders or stands, the bow-spring E, combined with the hinged leaves D, substantially in the manner and for the purposes set forth.

2. The combination, with the piece C and hinged side leaves, D, of the vertical end flanges, a a, rabbeted at the opposite corners of the upper end and arranged on the piece C and between the leaves D, as shown, whereby said flanges serve two purposes—one to prevent endwise movement of the book and the other to limit the extent to which the leaves can close—as described.

3. The book holder or stand consisting of the base A, the standard B, the bottom piece, C, the hinged leaves D, and the spring E, substantially as described, combined as set forth.

CHARLES L. WORK.

Witnesses:
D. C. MONTGOMERY,
E. I. MENDENHALL.